United States Patent [19]

Hirabayashi

[11] Patent Number: 5,067,744
[45] Date of Patent: Nov. 26, 1991

[54] AIR BAG SYSTEM
[75] Inventor: Hirokazu Hirabayashi, Kanagawa, Japan
[73] Assignee: Nissan Motor Company, Ltd., Yokohama, Japan
[21] Appl. No.: 527,474
[22] Filed: May 23, 1990
[30] Foreign Application Priority Data
  May 23, 1989 [JP] Japan ................... 1-129890
[51] Int. Cl.⁵ .......................... B60R 21/32
[52] U.S. Cl. ...................... 280/734; 180/282
[58] Field of Search ............ 280/728, 727, 734, 730, 280/731, 732, 736, 741, 735; 340/9; 307/10 R, 121; 180/282

[56] References Cited
U.S. PATENT DOCUMENTS

| | | |
|---|---|---|
| 3,758,131 | 9/1973 | Stephenson et al. ........ 280/150 AB |
| 3,884,497 | 5/1975 | Massengill et al. ......... 280/150 AB |
| 4,477,732 | 10/1984 | Mausner ............... 280/728 |
| 4,698,107 | 10/1987 | Goetz et al. ............ 280/728 |

FOREIGN PATENT DOCUMENTS

| | | |
|---|---|---|
| 2516185 | 10/1975 | Fed. Rep. of Germany . |
| 3809074 | 10/1989 | Fed. Rep. of Germany . |
| 2005887 | 4/1979 | United Kingdom . |

*Primary Examiner*—Kenneth R. Rice
*Attorney, Agent, or Firm*—Pennie & Edmonds

[57] ABSTRACT

An air bag system for an automotive vehicle includes gas generator means for generating a pressurized gas for expanding an air bag for restricting movement of a passenger and thus for preventing the passenger from colliding onto the vehicular interior facility and/or a windshield. The gas generator means comprises a low pressure gas generator and a high pressure gas generator having mutually different gas generation capacity. Upon collision, the low pressure gas generator is triggered to fire at earlier timing than that of the high pressure gas generator for reducing impact exerted on the passenger at the initial stage of air bag actuation.

2 Claims, 1 Drawing Sheet

AIR BAG SYSTEM

BACKGROUND OF THE INVENTION

1. Field of the Invention

The present invention relates generally to an air bag system for protecting a passenger in an automotive vehicle from collision with the vehicle interior, window and so forth in case of accident. More specifically, the invention relates to an air bag system which has dual gas generators and can reduce shock on the driver upon firing.

2. Description of the Background Art

In modern automotive technologies, it is becoming popular to facilitate an air bag system for protecting passengers from collision with the vehicular cabin facilities or front window. For example, SAE paper SP-736, P108, "Automatic Occupant Protection System", discloses an air bag system, particularly adapted for protection of a person in the passenger seat. The proposed air bag system employs dual gas generators for firing at different times, so that the internal pressure of the air bag is made to rise in two different pressure rising characteristics.

Such a proposal may achieve a certain degree of reduction of the initial shock exerted on the passenger upon and initial firing of the first gas generator. This can be achieved by utilizing a smaller capacity gas generator than is employed in a system using a singular gas generator. However, since the proposed dual gas generator system employs two equal capacity gas generators, the level of reduction of shock on the passenger is not satisfactory.

SUMMARY OF THE INVENTION

Therefore, it is an object of the present invention to provide an air bag system which can provide satisfactory reduction of initial shock on the passenger at the initial stage of firing without causing degradation of passenger protecting performance.

In order to accomplish the aforementioned and other objects, an air bag system for an automotive vehicle, according to the present invention, includes gas generator means for generating a pressurized gas for expanding an air bag for restricting movement of a passenger and thus for preventing the passenger from colliding with the vehicle interior and/or the windshield. The gas generator means comprises a low pressure gas generator and a high pressure gas generator having mutually different gas generation capacities. Upon collision, the low pressure gas generator is triggered to fire at an earlier time than the high pressure gas generator, for reducing the impact exerted on the passenger at the initial stage of air bag actuation.

According to one aspect of the invention, an air bag system for an automotive vehicle, comprises:

a first gas generator for generating a first pressure level of pressurized gas for expanding an air bag;

a second gas generator for generating a second pressure level of pressurized gas for expanding an air bag, the second pressure level being so selected as to be higher than that of the first level and that the total pressure level of the first and second pressure levels is satisfies a required level is for restricting passenger's movement;

a power source for supplying power for firing the first and second gas generators in response to detection of vehicular collision; and a delay means for providing a given delay in deliverance of the power supply for the second gas generator so that the second gas generator is triggered after the given delay time from the trigger time of the first gas generator.

Preferably, the delay means comprises an ON-delay timer for providing delay time corresponding to a preset time constant.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding purpose only.

In The Drawings.

DESCRIPTION OF THE PREFERRED EMBODIMENT

Figure 1:
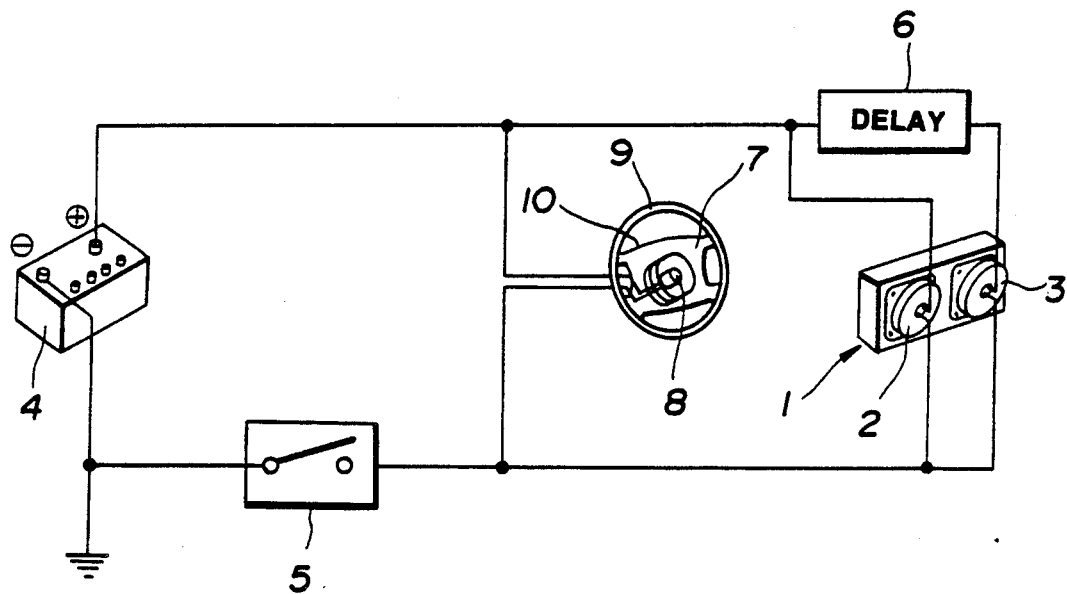
FIG. 1 is a diagrammatical illustration of the preferred embodiment of an air bag system according to the present invention.

Referring now to the drawings, particularly to FIG. 1, the preferred embodiment of an air bag system, according to the present invention, has an air bag unit 1 which is facilitated on a instrument panel in front of the passenger seat of the vehicle. The air bag system is provided with a low pressure gas generator 2 and a high pressure gas generator 3. The capacities of the low pressure gas generator 2 and the high pressure gas generator 3 are selected so that the gas generation capacity of the low pressure gas generator 2 is smaller than that of the high pressure gas generator 3 and the total gas generation capacity is that required for restricting the passenger's movement sufficiently to prevent the passenger from colliding onto the vehicular interior facility and/or the front windshield. The low pressure gas generator 2 and the high pressure gas generator 3 are connected between a vehicular battery 4 as a power source and a collision sensor 5, in parallel relationship to each other. A delay means 6 is provided in series to the high pressure gas generator. The delay means 6 may comprise a timer circuit having a time constant of 10 msec to 30 msec.

Another air bag unit 7 is installed in a steering wheel 9 for protecting the driver from collision onto the steering wheel and/or the front windshield. The air bag unit 7 has a has generator 8. The gas generator 8 is connected between the battery 4 and the collision sensor 5 in parallel relationship to the low and high pressure gas generators 2 and 3 of the air bag unit 1.

With the shown construction, the collision sensor 5 detects collision of the vehicle. Principally, the collision sensor 5 detects front side collision to establish a closed circuit across respective gas generators 2, 3 and 8. The gas generators 2 and 8 instantly react to initiation of the power supply by firing thus generating gas pressure within the air bag for expansion thereof. At this moment, since the power supply for the high pressure gas generator 3 is delayed by the delay timer 6, the high pressure gas generator 3 is held in a non fired state. After expiration of the predetermined delay period, the high pressure gas generator 3 is fired to rapidly increase the gas pressure in the air bag opposite the passenger seats.

As can be appreciated, since the air bag for the passenger in the passenger seat is initially expanded with relatively low pressure from the gas generated by the low pressure gas generator 2, the impact to be exerted on the passenger in the passenger seat at the initial stage of air bag actuation can be successfully reduced. However, since the pressure of gas generators 2 and 3 in combination provides sufficient pressure for restricting movement of the passenger, there is no degradation of safety assurance.

Therefore, the invention fulfills all of the objects and advantages sought therefor.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 2:
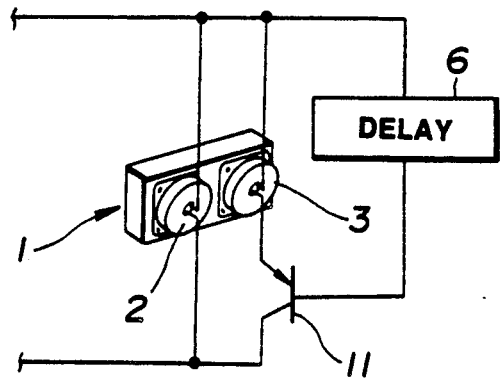
FIG. 2 is an illustration showing a modification of the means for providing lag timing in firing dual gas generators.

For example, the delay means may be modified as shown in FIG. 2. In the shown embodiment, a switching transistor 11 is provided in a circuit connecting the high pressure gas generator 3 to the battery 4. The switching transistor 11 has the base electrode connected to the battery 4 via a delay timer 6. With the shown circuit construction, the switching transistor 11 is maintained non-conductive for a given period determined by the time constant of the delay timer. Therefore, similar delay of trigger timing in firing the gas generator to that of the former embodiment of FIG. 1 can be achieved.

What is claimed is:

1. A stepped pressurized air bag system for an automotive vehicle comprising:

means for detecting and outputting a signal in response to a collision of said vehicle;

an air bag located with said automotive vehicle so as to restrain a passenger when pressurized;

a first gas generator for expanding said air bag to a first pressure level in response to said signal;

means for delaying said collision detection signal for a predetermined time interval;

a second gas generator for further expanding said air bag to a second pressure higher than said first level, said first and second pressure levels and said time interval being so selected as to satisfy a required level of restricting the passenger's movement while keeping an impact force of said air bag against the passenger caused by its being pressurized by said first and second gas generators within a required limit.

2. An air bag system as set forth in claim 1, wherein said delay means comprises an ON-delay timer for providing delay time corresponding to a preset time constant.

* * * * *